United States Patent [19]

Allio

[11] Patent Number: 5,099,320

[45] Date of Patent: Mar. 24, 1992

[54] METHOD OF AND INSTALLATION FOR THE PRODUCTION OF ORTHOSTEREOSCOPIC IMAGES

[75] Inventor: Pierre Y. J. Allio, Paris, France

[73] Assignee: Societe de Documentation d'Edition et de Redaction Soder, Paris

[21] Appl. No.: 449,649

[22] Filed: Dec. 12, 1989

Related U.S. Application Data

[63] Continuation-in-part of Ser. No. 233,628, Aug. 18, 1988, abandoned.

[30] Foreign Application Priority Data

Aug. 20, 1987 [FR] France ................. 87 11864

[51] Int. Cl.⁵ ............... H04N 13/00; H04N 15/00; H04N 7/01
[52] U.S. Cl. ................................. 358/88; 358/3; 358/140; 352/43; 359/462; 359/619
[58] Field of Search ............. 358/88, 3, 140; 350/130, 137, 167; 352/43

[56] References Cited

U.S. PATENT DOCUMENTS

| | | | |
|---|---|---|---|
| 3,852,524 | 12/1974 | Ando et al. | 178/6.5 |
| 3,932,699 | 1/1976 | Tripp | 178/6.5 |
| 3,959,580 | 5/1976 | Chocol et al. | 178/6.5 |
| 4,509,835 | 4/1985 | Adler | 352/43 |
| 4,573,191 | 2/1986 | Kidode et al. | 382/1 |
| 4,621,897 | 11/1986 | Bonnet | 350/130 |
| 4,677,470 | 6/1987 | Cooper et al. | 358/98 |
| 4,694,185 | 9/1987 | Weiss | 250/578 |
| 4,757,350 | 7/1988 | Street | 355/22 |
| 4,804,253 | 2/1989 | Stewart | 358/251 |

FOREIGN PATENT DOCUMENTS

| | | |
|---|---|---|
| 0084998 | 1/1982 | European Pat. Off. |
| 2062485 | 6/1927 | Fed. Rep. of Germany |
| 1936070 | 1/1971 | Fed. Rep. of Germany |
| 2016547 | 11/1971 | Fed. Rep. of Germany |
| 2032977 | 1/1972 | Fed. Rep. of Germany |
| 2055935 | 6/1972 | Fed. Rep. of Germany |
| 2140944 | 2/1973 | Fed. Rep. of Germany |
| 2302151 | 7/1974 | Fed. Rep. of Germany |
| 1394818 | 2/1964 | France |
| 1482247 | 5/1966 | France |
| 2285037 | 4/1976 | France |
| 2399173 | 2/1979 | France |

Primary Examiner—John K. Peng
Attorney, Agent, or Firm—Seidel, Gonda, Lavorgna & Monaco

[57] ABSTRACT

An apparatus for the production of relief (three-dimensional) images includes a single objection lens and a lenticular grating with a series of cylindrical elementary lenses. An imaging surface is located behind the lenticular grating. Each lens in the grating causes the image focused thereupon to be reversed in relation to the axis of the cylinder. Electronic means are provided to reverse the image focused by each cylindrical lens.

10 Claims, 10 Drawing Sheets

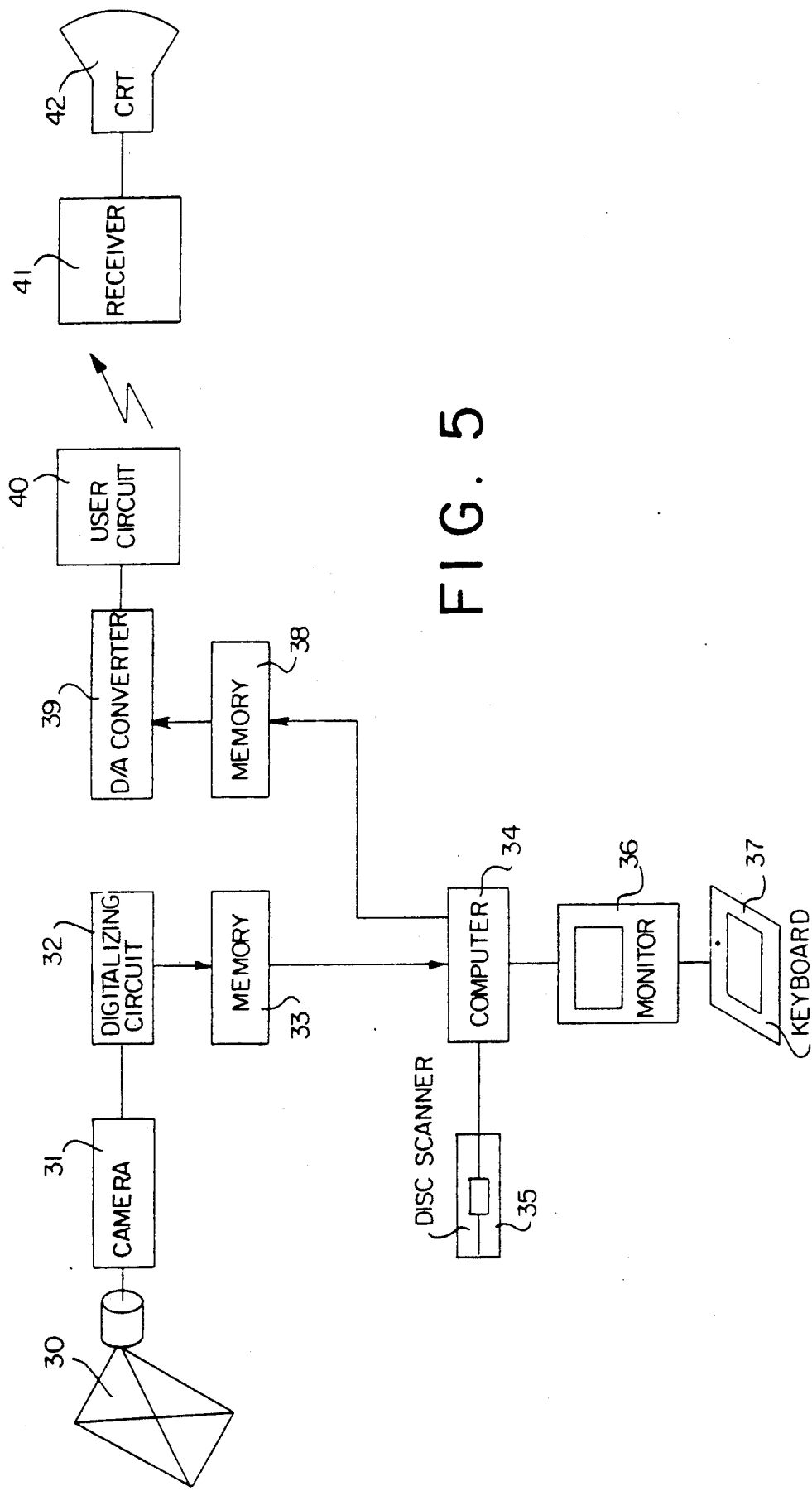

METHOD OF AND INSTALLATION FOR THE PRODUCTION OF ORTHOSTEREOSCOPIC IMAGES

RELATION TO OTHER APPPLICATIONS

This application os a continuation-in-part of application Ser. No. 07/233,628, filed Aug. 18, 1988, now abandoned. The parent case claims foreign priority based on French Patent Application No. 87 11 764, filed in France on Aug. 20, 1987.

FIELD OF THE INVENTION

The present invention refers to a method of and an installation for the production of relief (three dimensional) images, images of the orthostereoscopic type, employing the principle of a photograph or a view taken by means of a main lens and a lenticular optical surface comprising a series of elementary lenses, the photograph of the subject being taken from at least two different points of view corresponding to the two eyes of an observer, the series of lenses producing for each point from which the subject is viewed an image which is composed of spot images formed respectively by the main lens and each elementary lens, the image being restored via a system of lenses which is optically identical to that used for the photography.

In particular, the present invention relates to the production of relief images o the orthostereoscopic type in the form of video images.

BACKGROUND OF THE INVENTION

Relief or three-dimensional viewing techniques have been the subject of considerable study, all based on the reflections of the physics expert Lippmann (1845-1921).

The prior art which has evolved from these developments has in particular been the subject of the following patents:

| FR 1.394.818 | FR 1.482. 274 | DE 1.936.070 |
| --- | --- | --- |
| DE 2.016.547 | DE 2.032.977 | DE 2.055.935 |
| DE 2.062.485 | DE 2.140.944 | DE 2.302.151 |
| FR 74 30 904 | US 3.821.466 | FR 77 23 326 |

Questions of three-dimensional television have been the subject of various studies and in particular U.S. Pat. No. 3,932,699. This patent refers to a television system employing a photographic camera in front of a large-dimension lens followed by a lenticular surface. The image is reproduced by a cathode ray tube, the front face of which is a lenticular surface. This citation does not anywhere touch upon the problems of orthostereoscopy.

It is likewise appropriate to cite U.S. Pat. No. 4,487,490 which relates to a photographic apparatus for stereoscopic photography using a lens system and a lenticular optical surface. In this camera, the movement normally needed between the film and the lenticular surface is avoided by the use of a light beam divider which is used as a mirror and also by using a concave mirror. The problem of orthostereoscopy, although touched upon in this prior art document, is not resolved by this technique because all the optical components which are equivalent to a series of convergent lenses and a mirror do restore the image but also the points of view and the result is a pseudo stereoscopic image which is contrary to that which is claimed in the document.

To sum up, according to the prior art, in order to obtain a stereoscopic image, an objective lens is used which is followed by a lenticular surface.

However, if this image is observed through a lenticular surfade (restitution of the image in three dimensions), it is found that the stereoscopy is falsified because the points of view are reversed, those objects which in reality are remote seem to come close although their size and the concealed parts remain in accordance with reality.

According to the prior art, in order to avoid the drawbacks of pseudo-stereoscopy, it is known to use a relative movement of the objective lens in relation to the lenticular system in order to provide compensation. Another system resides in first of all taking the pseudo stereoscopic photograph behind the assembly constituted by the objective lens and the lenticular surface and then taking a fresh photograph of this photo by an identical method with the photo provided with a lenticular system.

Therefore, this double operation produces an orthostereoscopic photograph. However, the system is complicated and is not suitable for video applications.

U.S. Pat. No. 4,621,897 to Bonnet discloses a purely optical means for rectifying the problems of pseudostereoscopy by using a second lenticular grating disposed between the main lenticular grating and an imaging surface, such as photographic film. Although this second lenticular grating may generally solve the problem of reversed images formed by the first lenticular grating, this purely optical method has certain practical drawbacks. First, there is the expense of providing a second lenticular grating of such dimensions that will allow it to optically cooperate with the first lenticular grating. According to the Bonnet disclosure, this second lenticular grating must have the same gauge as the first lenticular grating, but must also have a much shorter focal length (column 8, lines 40-53). Further, since no lens system is ideal, it is very likely that a significant amount of light will be "lost" between the two lenticular gratings, requiring even longer exposure times. The Bonnet system also lacks versatility in image-processing that would be possible with an electronic system, as will be explained below.

Thus, the known techniques of stereoscopic photography do not make it possible, by simple means, to produce orthostereoscopic views; furthermore, the known means of taking orthostereoscopic photographs cannot be employed in video technology because photographing an image would in every case produce an image of very poor quality without any definition, very dark and with a time lapse.

The object of the present invention is to remedy these drawbacks and to produce a method by which it is possible, using a single objective lens associated with a lenticular surface (or an assembly of objective lenses correlated to increase the stereoscopic base and associated with a like number of lenticular surfaces) and needing no relative movement inside the optical system, to obtain orthostereoscopic images permitting of a very wide diffusion of stereoscoipic photography which can be applied likewise to video techniques and to images on paper or transparent carriers obtained from the video, that is to say images which are reconstituted dot by dot from video signals.

SUMMARY OF THE INVENTION

To this end, the invention relates to a method of the above type, characterized in that:
- the image is separated into its elementary images equal in number of the number of lenses,
- the elementary images are turned over on themselves in relation to their axis of symmetry (centre of symmetry) in the case of cylindrical lenses (spherical lenses), and
- the elementary images which remain ordered in the same way as prior to being turned over are recombined.

Thus, thanks to the fact that the elementary images are turned over on themselves, the right eye and the left eye will see the right point of view (right-hand point of view, left-hand point of view).

This method is carried out by an electronic analysis of the image formed by the optical system, cutting up this image into elementary images and either analogue or digital processing of the elementary images to turn them over and obtain the orthostereoscopic image.

The above method has the advantage of simplicity and of being capable of application to video techniques as well as to synthesized images obtained by a simulation of the method.

The invention likewise relates to an apparatus for carrying out the method, characterized in that it is composed of an optical system consisting of a single lens and an optical lenticular surface as well as an image surface with an image analyzer which decomposes the image into its elementary images and an inverter for turning over the elementary images on themselves while retaining the order and also a viewing means.

According to another characterisitc feature of the apparatus, the analyzer is an optoelectronic sensor and the inverting means is an electronic circuit or a data handling circuit for analogue or digital processing.

This apparatus is itself relatively simple and is above all applicable to video techniques. According to an alternative embodiment, the lenticular surface can be integrated into a video camera in front of its sensitive surface. It is likewise possible to form the image by an optical system on ground glass surface, the camera taking the image on this ground glass surface. When the photograph is taken with the camera, there will be a choice between the resolution and the number of viewing points required to achieve multistereoscopy. Indeed, the photosensitive sensor of the camera is composed of the same number of elements so that it is possible either to have a small number of viewing points and a high image resolution or a large number of viewing points (multistereoscopy) and a reduced level of resolution. In the case of a photograhic tube, the numerizer and the display (screen) limit resolution.

Finally, as already explained hereinabove, the technique thus developed can likewise be applied to synthesis images.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 5 is a diagram of a video installation for carrying out the invention;

DETAILED DESCRIPTION OF THE INVENTION

Figure 1:
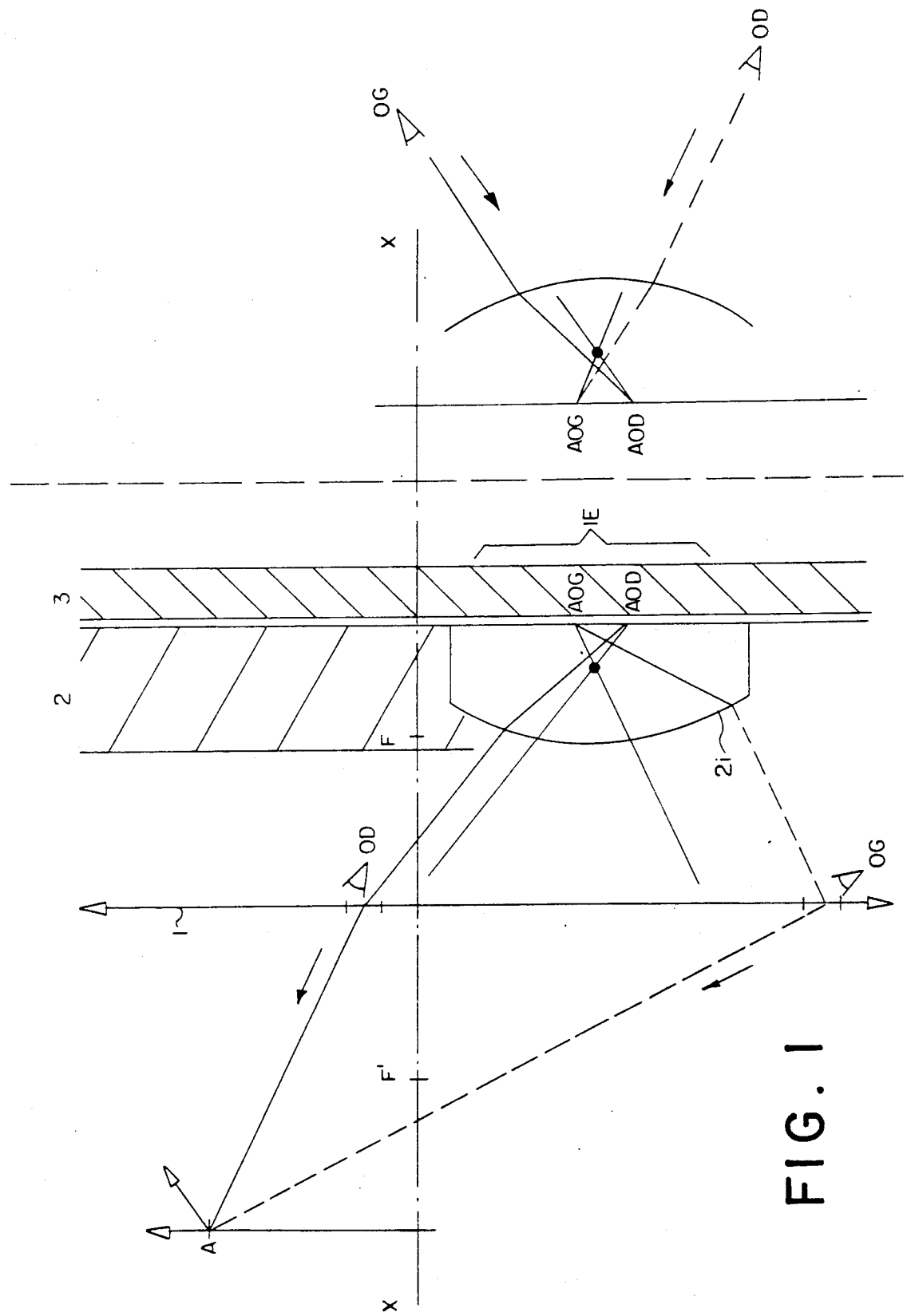
FIG. 1 is a diagram explaining an optical photographic system showing the effect of pseudo stereoscopy.

FIG. 1 is a plan view of an optical system for taking stereoscopic images. This optical system is composed of a lens 1 of large dimensions behind which there is a lenticular surface 2, that is to say a surface consisting of an assembly of lenses bounded by cylindrical surface which are all perpendicular to the plane of the drawing and of which only one (2i) is shown. As used herein, the term "cylindrical" in reference to the elementary lenses is understood to means any lens whose imaging surface is a portion of a cylinder. Similarly, as used herein, a "spherical" lens is one whose imaging surface is a portion of a sphere.

Figure 2:
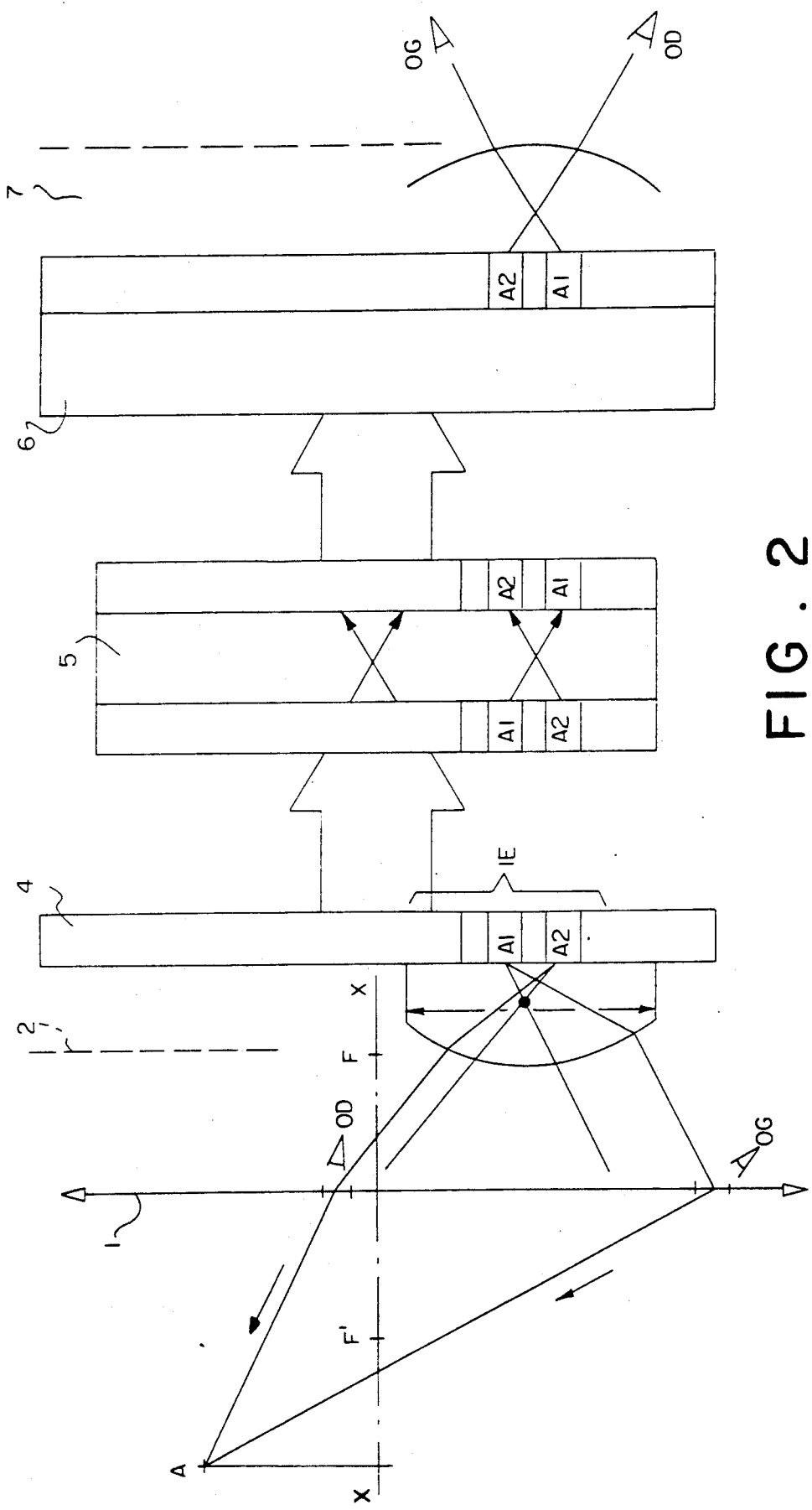
FIG. 2 is an optical diagram of the invention.

To understand stereoscopic photography and the problem of orthostereoscopy, FIG. 2 has been subdivided into a left-hand part corresponding to the photograph and a right-hand part corresponding to observation of the image.

Referring first to FIG. 1, for taking the photograph, an object point A is situated in front of the lens 1; at the level of the lens, the right eye OD is shown diagrammatically and the left eye OG is shown looking at the point A and thus defining a certain point of view. The system of stereoscopic photography with a large lens 1 and a lenticular system 2, "sees" the object point A as if both eyes OD and OG were placed at the level of the lens 1. Indeed, a small part of the lens 1 situated at the position of the eyes OD and OG respectively receives the light beams emitted by the object point A and destined respectively for the right eye and the left eye (seen in plan in FIG. 1).

If we trace the light rays which are thus destined for the right eye and the left eye and pass through the optical system formed by the lens 1 and the lenticular system 2, we arrive at the image point AOD which is the image point intended for the right eye and the point AOG which is the image point intended for the left eye.

The ray of light corresponding to the right eye is represented by the solid line while the ray of light intended for the left is represented by a broken line.

The image points AOG and AOD can be formed, for instance, on a photosensitive surface 3 placed behind the lens system 2 or may appear on a ground glass screen.

In the simplest case of a single observer who stays in position (which corresponds to a stereoscopic point of view), the right eye and the left eye occupy a precise position which remains fixed. On a photosensitive surface, this would correspond to placing behind the objective lens 1 two images in fixed position. In this case, the image points AOG and AOD would result from each object point A. When restored, only a single observation point for the stereoscopic image would be produced.

However, when the photograph is taken, there is no need to limit the use of the objective lens to one stereoscopic point of view, realized, for example, by two diagphragms situated at the location of the "left eye" and of the "right eye", but instead there is provided a larger diaphragm providing a continuity of image points by the "right eye" and by the "left eye" behind each lens in the lens system. This diagram corresponds to a horizontal slit. All the image points formed by the objective lens and a single lens in the system is referred to as the "elementary image IE".

In the case of a cylindrical lens systems with a vertical axis, each part of the lens forms an image point from the object point A. Thus a number of image points are obtained which include the points AOG and AOD. This remark only applies in the horizontal direction and not in the vertical direction since the system comprises vertical cylindrical lenses.

In the case of a system of spherical lenses distributed in a horizontal direction and the vertical direction, the diaphragm is useless.

It must be remarked that the overall image formed by the objective 1 is reversed, an arrangement which is not totally modified by the lens system which only transforms the image at elementary level.

Under these conditions, in order to observe the image, it is necessary to be positioned where the left eye and the right eye occupy the position shown in FIG. 1. To have one's eyes in the proper positions, a viewer would have to stand upside-down behind the screen.

Upon observation of this overall image with the interposition of a lens system, the left eye will see the image poing AOD intended for the right eye and the right eye will see the image point AOG intended for the left eye. The result is a pseudo stereoscopic effect.

FIG. 2 shows the method and the installation according to the invention by which it is possible to restore an image to provide an orthostereoscopic view, that is to say a three-dimensional view in which the right eye and the left eye effectively see the parts of the image which are intended for them.

According to the invention, the image is broken down into elementary images (IE), of which the image points AOG, AOD are respectively received by zones A1, A2 of an optoelectronic sensor of the CCD type which analyzes the image, or a tube corrected for geometrical aberrations; the analogue signals which are thus picked up and which correspond to the image points are nubmered so that they can be processed by an electronic circuit 5 which reverses the elementary images while retaining their order in the overall image.

The reversal described may likewise be carried out in an analogue way.

Whatever type of processing is involved, this reversal is carried out electronically. It is shown diagrammatically in FIG. 2 as the unit 5. The signals thus obtained are transmitted to a display means 6 which again displays the elementary images corresponding to each lens in the system to allow them to be used by the right eye OD and the left eye OG through a lens system 7 which is optically identical to the lens system 2 which was used for taking the photograph. Thus, it is found that the right eye OD sees the image point from the zone A2 and the left eye OG sees the image point from the zone A1 as if the right eye and the left eye occupied the position shown in the photographic part. Therefore, one is viewing an orthostereoscopic image.

The method of the present invention produces three-dimensional or relief images of the orthostereoscopic type according to the principle whereby a photograph is taken or viewed with the help of a lenticular optical surface comprising different elementary lenses.

The photograph is taken with a single objective lens according to at least two different points of view corresponding to the two eyes of an observer; the series of elementaty lenses forms an image of the object for each direction of view. This image is composed of elementary images formmed respectively by the optical assembly comprising the lenticular optical surface.

In order to cause the image that is formed on the photosensitive surface 3 to become coherent so that it may be viewed on a monitor having a compatible lenticular surface, the electronic signal created by the image on the photosensitive surface must be processed electronically before it is passed to the monitor. The result of this electronic processing is to reverse individual elementary images while retaining the order of elementary images within the composite image. In a preferred embodiment of the present invention, the elementary lenses in the lenticular grating are vertically arranged relative to the photosensitive surface or the monitor, while the scanning direction of thepicture elements (pixels) of the television equipment is horizontal. Thus, the electronic processing may be effected by rearranging the order of pixels in each of the horizontal scan lines.

As an example of how the alteration of the order of pixels within each scan causes a suitable alteration in the image, consider a horizontal line through a video screen which is scanned from left to right in the course of one pass of the video scan. In a conventional television camera, the pixels along this horizontal line will be input and output in the same order. In a hypothetical example having twelve pixels across the screen, the input and output will be:

| 1 | 2 | 3 | 4 | 5 | 6 | 7 | 8 | 9 | 10 | 11 | 12 |
|---|---|---|---|---|---|---|---|---|----|----|----|

The photosensitive video screen in one embodiment of the present invention is divided among a number of cylindrical lenses. Because the scan line is perpendicular to the lens' axes, each horizontal scan line will be subdivided into as many divisions as there are cylindrical lenses. Each division of the scan will correspond to one elementary image on the screen. For the hypothetical example, consider the case of twelve pixels in a horizontal line, divided by three vertical cylindrical lenses:

| 1 | 2 | 3 | 4 | \|\| | 5 | 6 | 7 | 8 | \|\| | 9 | 10 | 11 | 12 |
|---|---|---|---|------|---|---|---|---|------|---|----|----|----|

In the above example, the double vertical line \|\| represents the borders between three cylindrical lenses. In the physical world, the three cylindrical lenses will each reverse the incoming image as it forms an elementary image on the photosensitive screen. It is the function of the present invention to revese the order of pixels within each elementary image to form the corrected image. So, taking the pixels within each cylindrical lens and reversing them (but keeping the order of cylindrical lenses as they are scanned), the system of the present invention will output the following:

| 4 | 3 | 2 | 1 | | 8 | 7 | 6 | 5 | | 12 | 11 | 10 | 9 |

The present invention divides the pixels across a horizontal line into batches and reverses each batch individually. In the case of twelve pixels divided among four cylindrical lenses, each batch will have three pixels associated with it. When processed by the present invention, the output would be:

| 3 | 2 | 1 | | 6 | 5 | 4 | | 9 | 8 | 7 | | 12 | 11 | 10 |

Here, the line of twelve pixels is divided into four batches of three, and each of the four batches is reversed individually. By performing this dividing-and-reversing process to each scan line in a television raster, the necessary reversal of each elementary image along its longitudinal axis is accomplished.

Figure 3A:
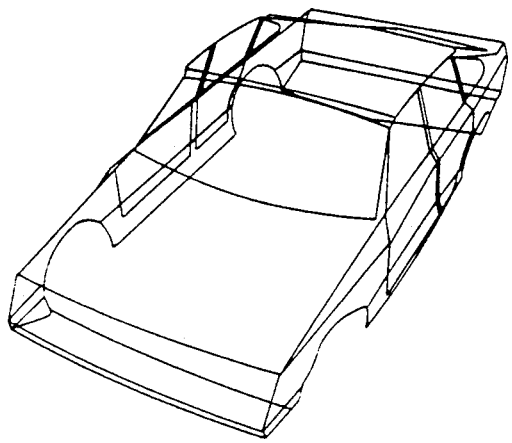
FIGS. 3a-3c are a set of images showing the general method according to the invention.
Figure 3B:
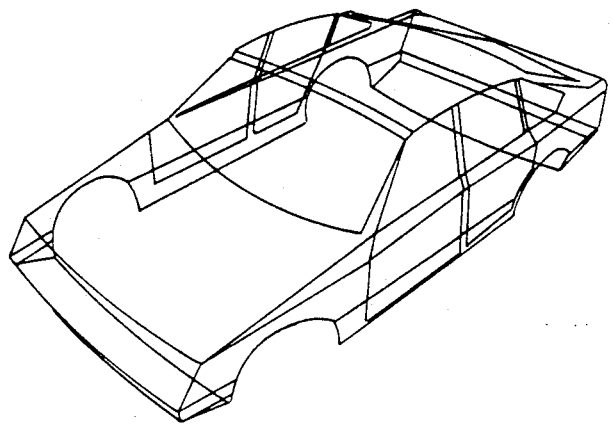
Figure 3C:
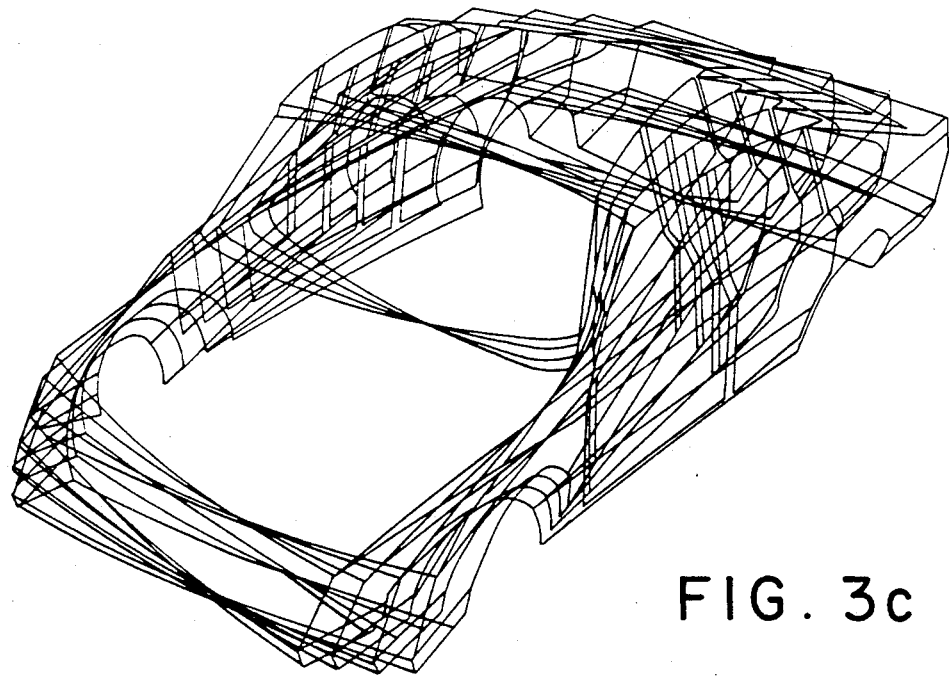

FIGS. 3 and 4 show an example of the method of the present invention as applied to an image of a three-dimensional object. FIGS. 3a and 3b are two views of the same automobile body, observed from slightly different angles. Generally FIG. 3a is the image of the automobile body seen with the left eye, and FIG. 3b shows the automobile body as viewed simultaneously through the right eye. The difference in view points in FIGS. 3a and 3b is exaggerated somewhat for clarity. When each eye is viewing one of these images, the brain is capable of reconstructing the spatial volume of the object. FIG. 3c shows four superimposed views of the object from varying viewpoints. These four viewpoints are only four of an infinite number of viewpoints from which the object can be observed. Each elementary lens accepts (when the object is being photographed) and emits (when the image is being viewed) a continuous series of images through the angle of field of each elementary lens, i.e., the angle which determines an angular zone. Although the image associated with each elementary lens is continuous, only two points (each corresponding to one eye) can be observed at any one time by a two-eyed observer. Any group of two points of view may be considered as being a left and a right point of view.

Figure 4A:
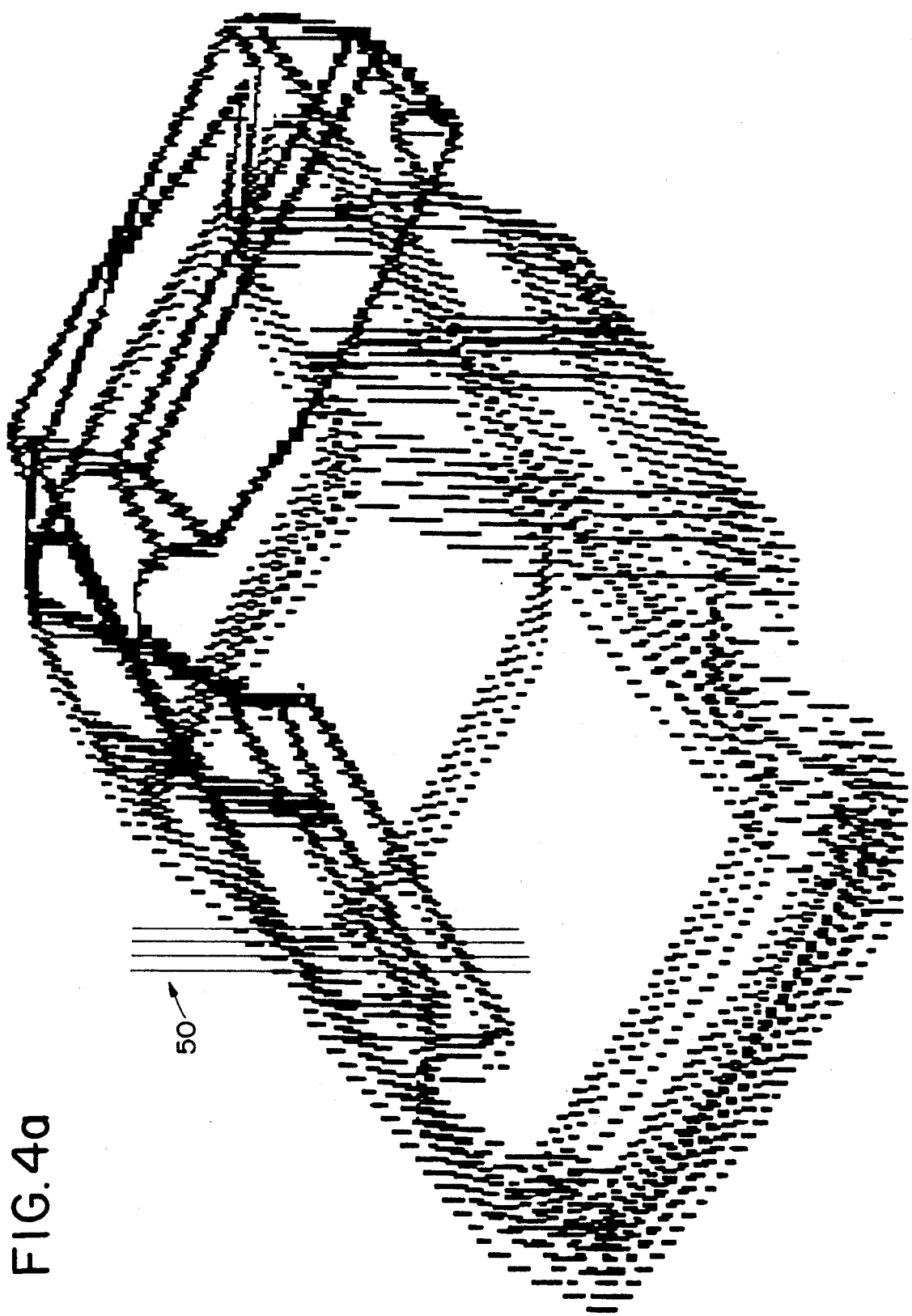
FIGS. 4a-4b a more detailed set of images showing the method according to the invention.
Figure 4B:
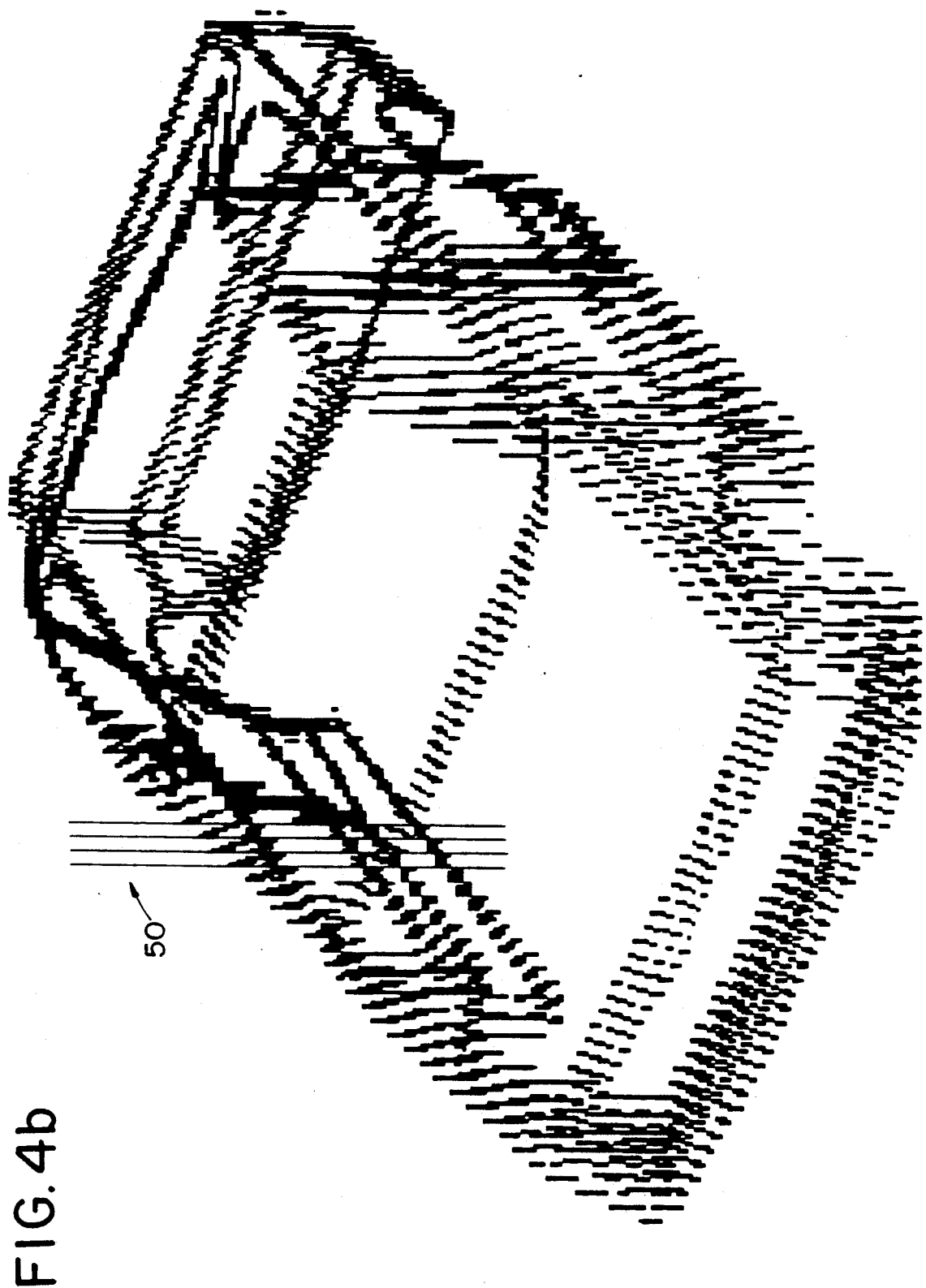

FIGS. 4a–b show a representation of the object in FIG. 3 as processed under the method of the present invention. FIG. 4a is an image formed by a lenticular grating such that each elementary lens is four pixels wide. (The image is simlilar to that of FIG. 3, except that the angle of the field between the two viewpoints is more realistically narrow than that of FIGS. 3a and 3b. It should also be emphasized that the processing of the image by the lenticular grating is fundamentally different from the image of FIG. 3c, which is merely a superimposition of four single viewpoints.)

Vertical lines 50 show the borders between the elementary lenses in the lenticular grating as superimposed on the image. It can be seen that within each elementary image there is room for four pixels across each elementary image. Each set of pixels in one position within each elementary image (for example on the far right within each elementary image) corresponds to an image of the object through one viewpoint. With a four-pixel-per-elementary-image resolution, four viewpoints out of an infinite family are registered on the image surface. Any two of these viewpoints can be observed to create the three-dimensional image when one set of pixels is viewed by one eye and another is viewed by the other eye.

In FIG. 4a it can be seen that, in the portion of the image relating to a line passing from the lower left to the upper right (as in the far edge of the windshield), the groups of four pixels within each elementary image are each sloped from the lower left to the upper right. However, if this image in FIG. 4a is viewed through a lenticular grating, each elementary lens in the grating will reverse the order of pixels from left to right so that the line viewed through each of the elementary lenses will be from upper left to lower right, even though the line over a series of elementary images will be from lower left to upper right. The result will be a garbled image because each elementary image will be backwards.

The present invention electronically reverses the order of pixels within each elementary image before it is viewed through a lenticular grating, so that the reversing processes of the electronic processing and the lenticular grating will cancel out. FIG. 4b shows the image of the automobile body where the sequence of pixels within each elementary image has been reversed. The revesal of pixels is clear from a comparison of FIGS. 4a and 4b. Viewed without a lenticular grating, the image of 4b would itself appear to be garbled; the lower left to upper right line of the far windshield is shown as an upper left to lower right line within each elementary image. However, when the image of FIG. 4b is viewed through a lenticular grating, the elementary lenses of the grating reverse the order of the pixels again, placing them back in their correct order. Thus, if one were to place a lenticular grating of the correct dimensions over FIG. 4c and so arrange his eyes that one family of pixels is aligned with one eye and another family of pixels is aligned with another eye, a three-dimensional effect will be created. Viewing FIG. 4a through a lenticular grating, however, will yield an incoherent image.

In practical applications of lenticular grating systems, the lenticular grating is commonly combined with objective lenses and other optical devices. As a result of observing the reconstituted image through another lenticular grating, the final image may be reversed as a whole with respect to the original image; that is the reconstituted image may be coherent but reversed as a whole from left to right. However, this reversal of the entire picture can be cured easily through electronic means known in the art.

In practical applications of the present invention, the width of the cylindrical lenses on the lenticular grating must be chosen to take into account resolution and providing a sufficient difference between the images going to each of the viewer's eyes. The cylindrical lenses must be of a width sufficient to expose enough pixels that can be sensibly reversed. For example, in the hypothetical twelve-pixel screen above, to subdivide the screen into twelve batches would make no sense, because batches of one pixel each cannot be reversed. At the same time, if the elementary images are too wide, the borders between the images behind each cylindrical lens will be conspicuous and picture quality will be unsatisfactory.

FIG. 5 is a diagram showing a video installation for taking orthostereoscopic images.

This installation consists of a photographic camera 31 which processes the image 30. The camera 31 is followed by a digitalizing circuit 32 which converts the analogue signal supplied by the camera 31 to a digital signal. This digital signal is stored in the memory 33 to be fed to a computer 34 having various peripherals such as a disc scanner 35, a monitoring screen 36, and a keyboard 37. The signal processed by the computer 34 is transmitted to a memory 38 and through a digital-/analog converter 39, the signal is converted to an analog signal transmitted to a user circuit 40 such as an emitter, a recording means such as a tape recorder, etc.

The signal thus processed may likewise be transmitted to a television receiver 41 in order to be viewed on a cathode ray screen 42 in accordance with three-dimensional television techniques, that is to say through an interposed lenticular system.

The system described hereinabove is preferably embodied in electronic circuits which process the data in real time and therefore more rapidly. Such circuits are far simpler and therefore far less expensive. The electronic system consists preferably of a camera 31, a digitalizer 32, a turn-over card, a digital/analog converter, possibly a system for the transmission or storage of images and a reception and display means, still comprising a lenticular system.

Although the description given hereinabove employs a digital processing arrangement, it is likewise possible to perform similar processing on the analogue signal without passing through the digitalization stage.

The description of the invention given hereinabove in principle employs a single lens 1 for taking the photograph (FIG. 1). This lens may likewise be replaced by an equivalent means in order to modify (increase) the stereoscopic base. For this, it is necessary to replace the single photographic assembly by a plurality of correlated identical assemblies, that is to assemblies of which the diaphragms in the form of a horizontal slit have each time only a width corresponding to a fraction of the total aperture so that the superimposition of images of one and the same scene, formed behind the lenticular systems, yields a single image corresponding to that which would have been obtained with the single system with the exception of the different stereoscopic base.

Furthermore, the number of systems used simultaneously must not exceed the number of selected viewing points.

The above example is directed to an embodiment of the invention having a grating of cylindrical lenses, arranged vertically with respect to the eyes of the observer. However, a lenticular grating of spherical lenses could be used to create the three-dimensional image without the necessity of having the observer's eyes specifically oriented in one direction relative to the viewing screen. In the embodiment having spherical lenses, the rearrangement of pixels must be accomplished not only within the scan line, but among a number of neighboring scan lines so that the circular elementary images on the imaging surface will be reversed through their center point.

Figure 6:
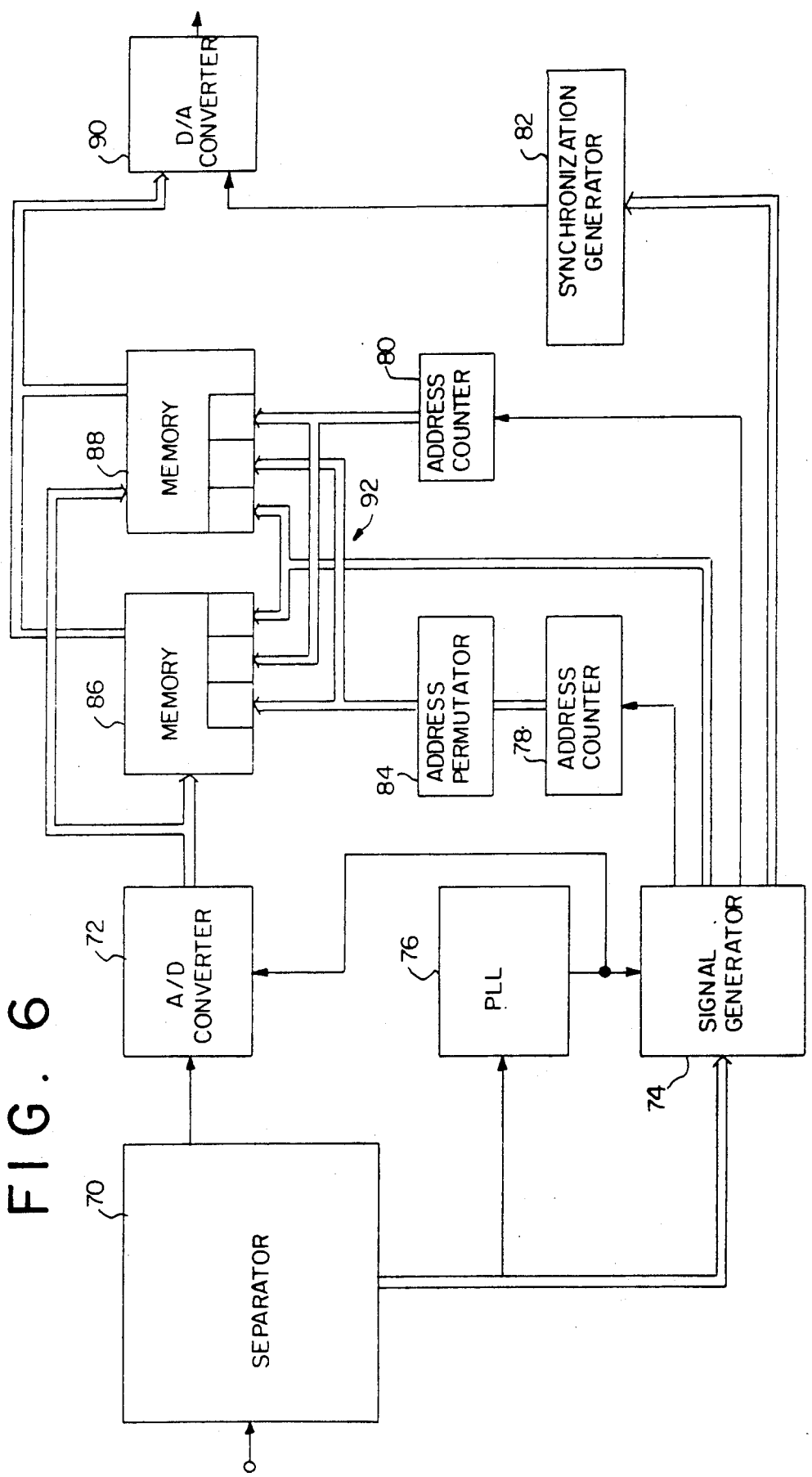
FIG. 6 is a diagram of another video installation for carrying out the invention.

FIG. 6 is a block diagram showing another embodiment of the electronic image-processing system of the present invention. The apparatus shown in FIG. 6 performs the alteration of the order of pixels in each scan line, as described above. The input, a sequence of signals relating to the image along each horizontal scan line as it is scanned in a raster, is fed into separator 70. Separator 70 accepts the sequence of signals and feeds the signal to an analog/digital converter 72 and a signal generator 74 in such a way that signal generator 74 will be able to keep track of the location of each pixel on its appropriate scan line, so that the pixels will "line up" correctly as scanned lines are pieced together to form an image on a screen. Simultaneously, analog/digital converter 72 accepts the actual signal (in the simple case of a black-and-white television, a signal representative of the light intensity of a particular pixel in an image). Analog/digital converter 72 and signal generator 74 may be coordinated, through means known in the art, by a phase-locked loop 76.

A sequence of signals passes through analog/digital converter 72 and signal generator 74. Signal generator 74, keeping track of the correct location on a scan line of a pixel being processed at a given instant, relays a control signal to address counters 78 and 80 and synchronization generator 82. Address counter 78 in turn activates an address permutator 84, which has stored within it the appropriate sequence of pixels in each scan line that will correspond to reversing the elementary images on the screen, and, if necessary, reversal of the entire corrected image. The exact sequence will of course vary with the number of cylindrical lenses used on the screen, and may also take into account factors such as distortion of the image within each cylindrical lens. The appropriate sequence of pixels may be incorporated into the address permutator 84 by any number of known means, such as by microprocessor or read-only memory.

The memory in this system is divided into two parts: dynamic memory 86 and permanent memory 88. The actual permutation of the pixels is made by the hardware connections between memories 86 and 88. Each location in dynamic memory 86 is associated with a permutated address. These data are transmitted for reading to the permanent memory 88. The reading is made dependent on the signals transmitted by signal generator 74 and the rad-only address counters 80. The memory of the system is divided into a dynamic part 86 and a permanent part 88 to allow the advantage of allowing fine control over the image quality. For example, in the case of a system using four pixels across each elementary lens, an operator can use the permanent memory 88 to dissociate the four families of pixels, to view each perspective individually and perform optical adjustments on the system. This feature has been found to be very significant.

The permutated signals are then read out of permanent memory 88 into digital-analog convertor 90. The converter 90 outputs the pixels in their new sequence to a monitor or a recording device, for simultaneous or later viewing through a viewing screen having an arrangement of lenses associated therewith compatible with that of the original photosensitive screen.

The elements of the system are preferably arranged so that the re-arrangement of pixels in each scan line takes no longer than the time required for one scan of the scan line, so that what appears on the reconstituted screen is only one scan behind what is input into the system.

Figure 7:
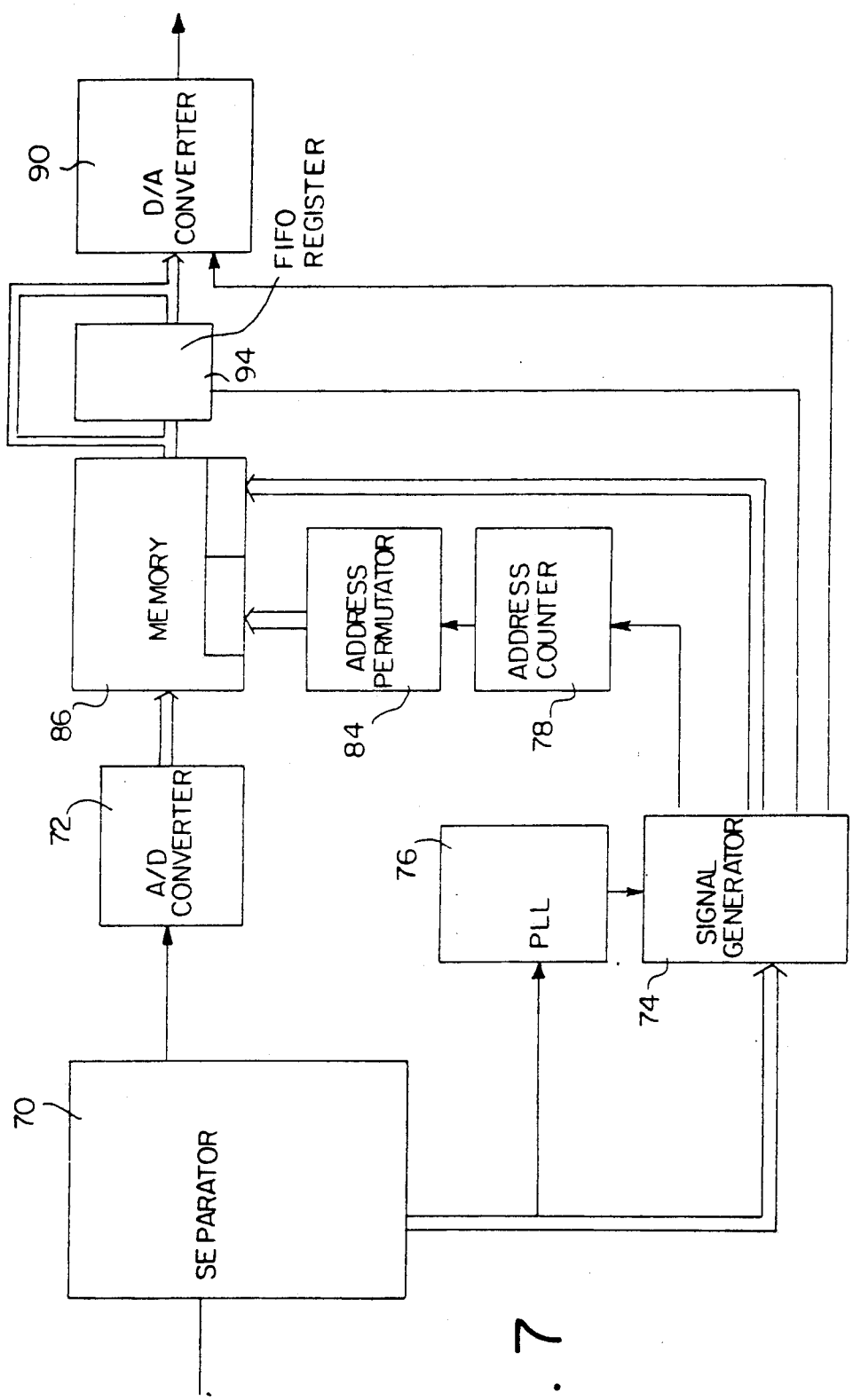
FIG. 7 is a diagram of another video installation for carrying out the invention.

FIG. 7 shows a simplified system for carrying out the method of the invention, which is similar to the system of FIG. 6, except that the memory portion, shown as block 87 in FIG. 7, is not divided into dynamic and permanent portions. In this embodiment the digital signals from analog/digital converter 72 are permuted as they are read into memory 87 simultaneously with the permuted addresses from address permutator 84 and address counter 78. The permuted pixels in memory 87 are then read out through a FIFO register 94. This embodiment has the advantage of simplicity and low cost, but it lacks the importantability to allow an operator to dissociate specific view points from the composite image.

Figure 8A:
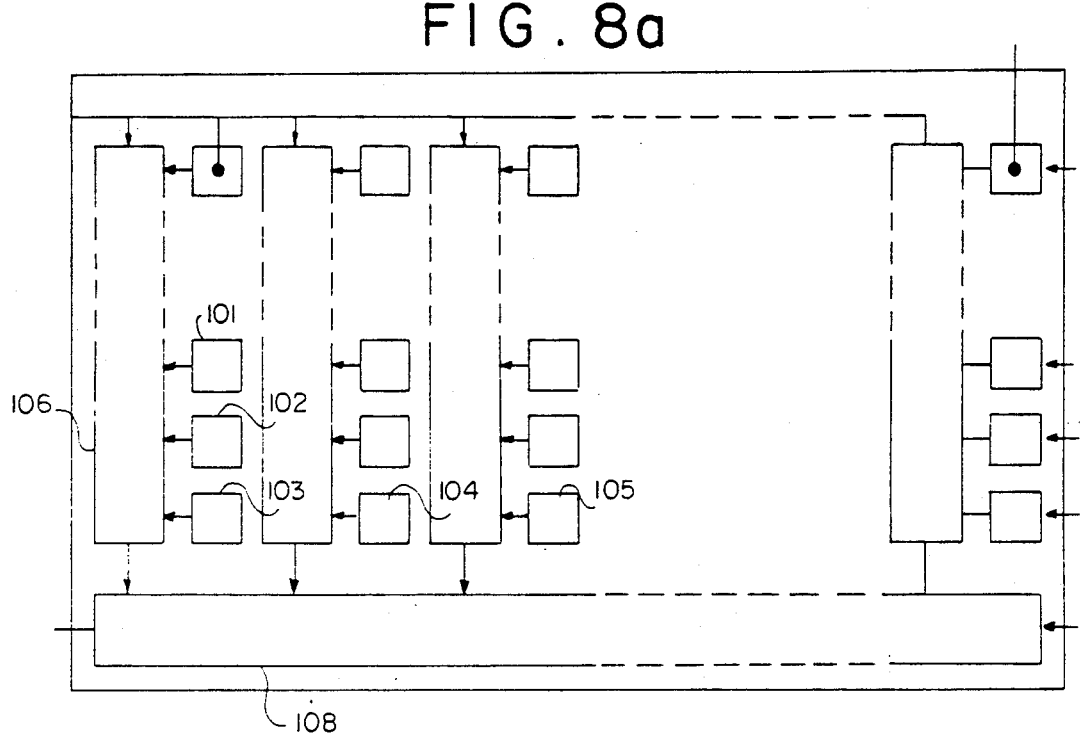
FIG. 8a-c shows the invention as embodied in a CCD camera.

In addition to the digital process described by the systems of FIGS. 6 and 7, the inversion of each elementary image may be accomplished by hard-wired permutation of the photocells comprising the picture elements in a CCD camera. In the photosensitive surface of a typical CCD camera, as shown in FIG. 8a, an array of photocells 101-105, etc., are arranged in rows and columns and exposed to an image. The array of photocells is disposed adjacent to a lenticular grating just like the photosensitive surface in the previous embodiments. Each photocell 101-105 etc. represents a pixel in one position of the image on the photosensitive screen. In the array of FIG. 8a, photocells 101, 102, and 103 cooperate with registers such as 106, for each column of pixels, and each of the registers 106 cooperate with a main register 108.

Figure 8B:
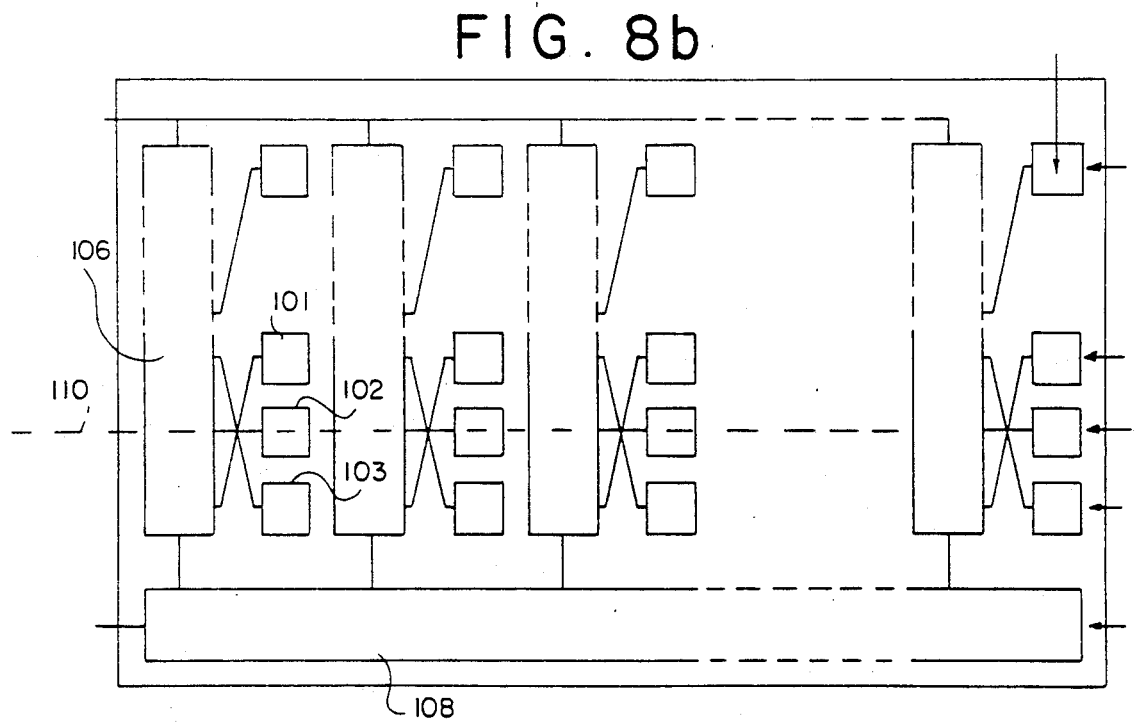

FIG. 8b shows a similar CCD camera as in FIG. 8a, except that the photocells are permutated. The relationship between the photocells, the vertical registers 106, and the main register 108 are the same as above, except that the connection between the individual photocells and the vertical register 106 are slightly altered. In the example of FIG. 8b, the connecting wires of photocells 101 and 103 are crossed, so that the image processing system "sees" the portion of the image associated with photocell 101 as if it were going to photocell 103, and vice-versa. It is clear that such a crossing of wires will have the effect of inverting a horizontal line of the image through the axis marked by dotted line 110. Thus, this example shows a hard-wired CCD photosensitive surface which is used with a lenticular grating of horizontally-arranged elementary lenses, each elementary lens being three pixels in width.

Figure 8C:
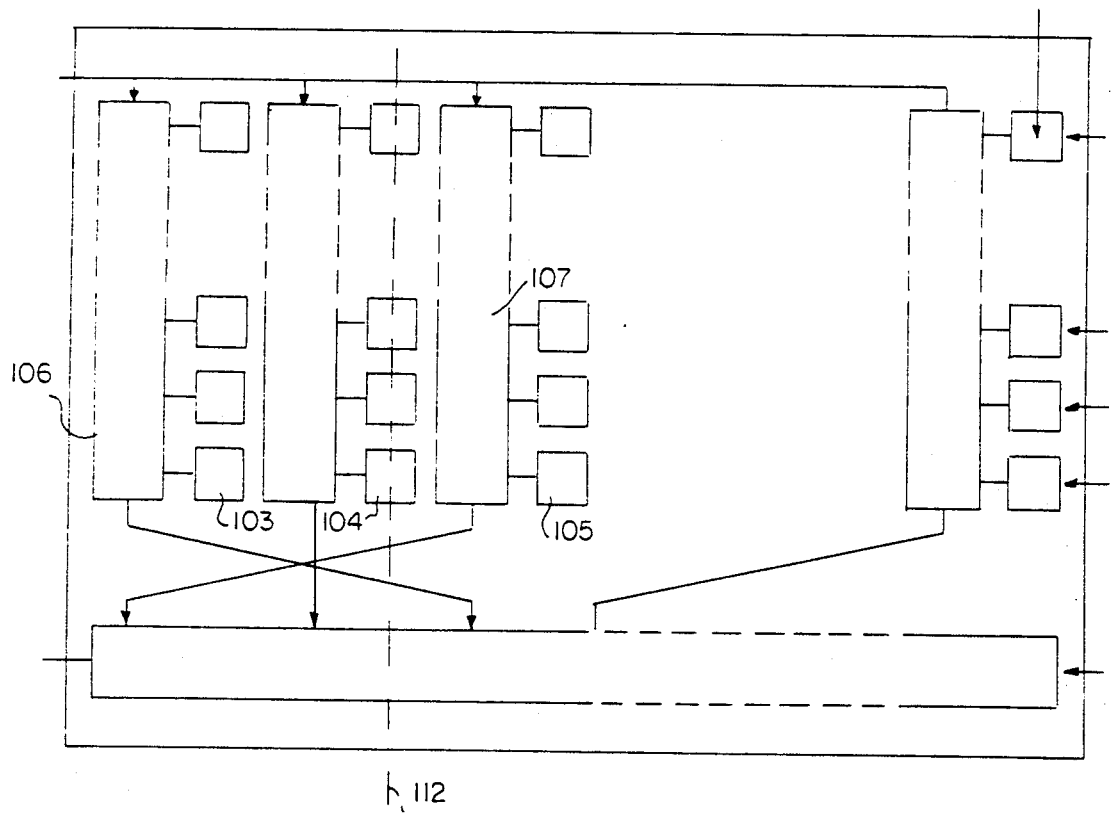

FIG. 8c shows another type of inversion of an elementary image, except that the wiring of the vertical register 106 is such that the induced inversion of the elementary image is for a vertical elementary image of three pixels in width, inverted around line 112. This inversion is accomplished by hard-wiring vertical registers 106 and 107 in such a way that they are "seen" by the main register 108 in each other's positions. The CCD surface of FIG. 8c corresponds to a lenticular grating having elementary lenses corresponding to every three vertical columns of pixels.

It should be noted that for processing reasons (turning over of the elementary images), the number of viewing points is predetermined so that there is associated with each viewing point an image point for each lens in the system. The image point is necessarily as large as the pixel of the part of the system which has the lowest resolution (camera or digitalizer or screen). There is no interest in having the image point equal to two "eldim" pixels (to use French terminology); in this case, it would be appropriate to double the number of lenses in the system to cover a larger image or the same image with a better resolution so that it is doubled.

The electronic means of the present invention provides great versatility in manipulating elementary images, which is not possible with a purely optical system. The electronic means of the present invention does not require an expensive extra lenticular grating disposed between the first lenticular grating and the photosensitive surface. The electronic means are realizable through known electronic components, and will not cause the image to darken, as would the second lenticular grating of an optical system. Further, the manipulation of elementary images through electronic means may also include computer enhancement to improve the image. It is conceivable to create a computer program to simulate the depth effects from a lenticular grating directly on the video surface, so as to create, for example, three-dimensional cartoons. Electronic equipment is more readily miniaturizable for use in practical camera equipment, whereas additional optical components contribute greatly to excess weight and fragility of equipment.

When the present invention is used in conjunction with black-and-white television equipment, the signals entering the system are simply representative of a light intensity corresponding to an appropriate shade of gray for a particular pixel in a televised image. Each pixel has only one variable associated with it, the variable of light intensity. With color equipment, however, three sets of variables must be taken into consideration: one for each of the primary colors that make up the pixels in a color television signal. A system according to the present invention must assure that the red, blue and green color dots are not only transposed appropriately on the video screen, but also that the appropriately-colored pixel signal is directed to the appropriate gun of the color television monitor. Also, color refraction within each of the elementary lenses may also have to be taken into consideration by the system.

There are currently in popular use two types of color television screen, one in which the colored picture elements forming the picture are dot-shaped, and another in which the colored areas are in the form of rectangular stripes. For equipment of the present invention, having vertically-disposed elementary lenses, the striped screen is preferable. In either case, an important consideration is the fact that the alternating pattern of colored areas, each area producing one of three colors but together forming the color images, will have various angles of incidence relative to the associated elementary lens. In addition to the features of the image being altered by the lenticular grating, the primary colors of the image will be altered in more or less incoherently, as various color dots will be defracted in various amounts, depending on the position of individual dots relative to each lens.

One proposed solution to this garbling of color is to use a screen having vertical stripes, and laying the screen on its side, so that the colored stripes are perpendicular to the elementary lenses. As the colors are perpendicular to the lenses, the same color will appear throughout the angle of incidence of each lens, and the colors will remain coherent.

When using color equipment, it is preferable to have the ability to manipulate not only individual elementary images, but to control the appearance of the picture as a whole through electronic means, so as to correct the color distortion (Moire effect) and general picture clarity.

In conclusion, the invention makes it possible to create orthostereoscopic images either on photographic carriers or on video carriers (magnetic tapes, digital discs or digital/analogue discs). It should be noted that the invention is likewise applicable to the production of synthesized orthostereoscopic images.

The present invention may be embodied in other specific forms without departing from the spirit or essential attributes thereof and, accordingly, reference should be made to the appended claims, rather than to the foregoing specification, as indicating the scope of the invention.

I claim:

1. A method of rendering an image formed on an imaging surface having associated therewith a single objective lens and a lenticular grating with an array of elementary lenses, the image formed on the imaging surface being displayed in the form of a video raster adjacent to a lenticular grating substantially similar to that associated with the imaging surface, comprising the steps of:

separating the image on the imaging surface into a plurality of elementary images, each corresponding to the area of the imaging surface disposed adjacent one of the elementary lenses;

electronically reversing each of the elementary images individually with respect to the axis of the elementary lens associated with each elementary image; and recombining the electronically reversed elementary images into a composite orthostereoscopic image having the same orientation as the image formed on the imaging surface.

2. In an apparatus for the production of relief images having a single objective lens, a lenticular grating with a series of cylindrical elementary lenses, and a photosensitive imaging surface for forming thereon an image comprising a plurality of elementary images, each elementary image being associated with a cylindrical elementary lens, a method for electronically processing the image formed on the imaging surface for display on a video raster having associated therewith a lenticular grating substantially similar to that associated with the imaging surface, comprising the steps of:

receiving a sequence of signals representing pixels in a video scan line;

subdividing the sequence of pixels in each video scan line into batches, each batch corresponding to the portion of the video line focused upon by one of the cylindrical lenses;

electronically reversing the order of pixels within each batch; and outputting the reversed pixel batches to the video raster in the order in which the batches were received, thereby reversing the elementary image corresponding to each cylindrical elementary lens.

3. Method as in claim 2, further comprising the steps of:

digitizing the signal associated with each pixel; and altering the order of pixels by reading a sequence of digitized signals associated with the sequence of pixels into a memory having permutated addresses.

4. A method of rendering an image formed on an imaging surface having associated therewith a single objective lens and a lenticular grating with an array of cylindrical elementary lenses, each elementary lens having a longitudinal axis, the image formed on the imaging surface being displayed in the form of a video raster adjacent to a lenticular grating substantially similar to that associated with the imaging surface, and having a plurality of video scan lines, comprising the steps of:

separating the image on the imaging surface into a plurality of elementary images, each elementary image corresponding to the area of the imaging surface focused upon by a corresponding one of the cylindrical elementary lenses;

electronically reversing each of the elementary images individually with respect to the longitudinal axis of the cylindrical elementary lens associated with each elementary image; and re-combining the electronically reversed elementary images into a composite orthostereoscopic image having the same orientation as the image formed on the imaging surface.

5. In an apparatus for the production of relief images having a single objective lens, a lenticular grating with a series of cylindrical elementary lenses and a photosensitive imaging surface comprising an array of photocells operatively connected to register means, a method for electronically processing the image formed on the imaging surface for display on a video raster having associated therewith a lenticular grating substantially similar to that associated with the imaging surface, comprising the steps of:

receiving a sequence of signals representing pixels in a video scan line;

subdividing the sequence of pixels in each video scan line into batches, each batch corresponding to the portion of the video scan line focused upon by one of the cylindrical lenses;

electronically reversing the order of pixels within each batch by cross-wiring the photocells in the imaging surface in each batch relative to their associated register means; and outputting the reversed pixel batches to the video raster to reflect the cross-wiring of the photocells to the associated registers, thereby reversing the elementary image corresponding to each cylindrical elementary lens.

6. An apparatus for the production of relief images, comprising:

(a) imaging means including
  (i) an objective lens,
  (ii) a lenticular grating comprising a series of elementary lenses arranged in a focusing relationship with the objective lens,
  (iii) a photosensitive imaging surface in a focusing relationship with the lenticular grating, the photosensitive imaging surface being divided into zones, each zone being associated with one elementary lens in the lenticular grating for forming an elementary image on the photosensitive imaging surface;

(b) display means including
  (i) a video raster,
  (ii) a display lenticular grating associated with the video raster, the display lenticular grating being substantially similar to the lenticular grating associated with the imaging surface; and (c) processing means including
  (i) means for electronically separating the image on the imaging surface into batches of signals, each batch identifiable with one elementary image,
  (ii) means for electronically reversing the order of signals within each batch, and
  (iii) means for electronically outputting the reversed signal batches to the video raster, whereby each elementary image formed on the photosensitive imaging surface is displayed in a reversed form on the video raster.

7. Apparatus as in claim 6, wherein the elementary lenses in the lenticular grating and the display lenticular grating have a longitudinal axis and a first surface which is a portion of the surface of a circular cylinder centered about the longitudinal axis, and wherein the elementary images are displayed on the video raster reversed with respect to the longitudinal axis of each elementary lens.

8. Apparatus as in claim 7, wherein the video raster includes a plurality of video scan lines arranged perpendicular to the longitudinal axes of the display lenticular grating, each video scan line having a sequence of pixels associated therewith.

9. Apparatus as in claim 8, wherein the processing means include means for altering the order of pixels within each video scan line by reading a sequence of digitized signals associated with the sequence of pixels into a memory having permutated addresses.

10. Apparatus as in claim 8, wherein the photosensitive imaging surface comprises an array of photocells operatively connected to registers, and wherein the processing means include an arrangement of cross-wiring of photocells to associated registers and wherein said photocells are cross-wired to associated registers.

* * * * *